US011675921B2

(12) United States Patent
Arthur et al.

(10) Patent No.: US 11,675,921 B2
(45) Date of Patent: Jun. 13, 2023

(54) DEVICE AND METHOD FOR SECURE PRIVATE DATA AGGREGATION

(71) Applicant: HAZY LIMITED, Shrewsbury (GB)

(72) Inventors: James Reid Desmond Arthur, Shrewsbury (GB); Luke Anthony William Robinson, Shrewsbury (GB); Harry Richard Keen, Shrewsbury (GB); Garry Hill, Sevenoaks (GB)

(73) Assignee: Hazy Limited, Shrewsbury (GB)

( * ) Notice: Subject to any disclaimer, the term of this patent is extended or adjusted under 35 U.S.C. 154(b) by 425 days.

(21) Appl. No.: 16/838,163

(22) Filed: Apr. 2, 2020

(65) Prior Publication Data

US 2021/0312064 A1  Oct. 7, 2021

(51) Int. Cl.
*H04L 29/06* (2006.01)
*G06F 21/62* (2013.01)
*G06N 20/00* (2019.01)
*G06N 5/04* (2023.01)

(52) U.S. Cl.
CPC .......... *G06F 21/6218* (2013.01); *G06N 5/04* (2013.01); *G06N 20/00* (2019.01)

(58) Field of Classification Search
CPC ....... G06F 21/6218; G06N 20/00; G06N 5/04
See application file for complete search history.

(56) References Cited

U.S. PATENT DOCUMENTS

| 10,460,235 | B1* | 10/2019 | Truong | ................. | G06F 18/214 |
| 2020/0065221 | A1* | 2/2020 | Truong | ................. | G06F 40/20 |
| 2021/0201078 | A1* | 7/2021 | Yao | ..................... | G06V 10/955 |

OTHER PUBLICATIONS

Neha Patki, The synthetic data vault, 2016, 399-410 (Year: 2016).*
Li et al., "DPSynthesizer: Differentially Private Data Synthesizer for Privacy Preserving Data Sharing", Proceedings VLDB Endowment, vol. 7, No. 13, 2014, pp. 1677-1680.
McClure et al., "Differential Privacy and Statistical Disclosure Risk Measures: An Investigation with Binary Synthetic Data", Transactions on Data Privacy, vol. 5, 2012, pp. 535-552.
(Continued)

*Primary Examiner* — Wasika Nipa
(74) *Attorney, Agent, or Firm* — Michael Best & Friedrich LLP (57) ABSTRACT

A computing system for enabling the analysis of multiple raw data sets whilst protecting the privacy of information within the raw data sets, the system comprising a plurality of synthetic data generators and a data hub. Each synthetic data generator is configured to: access a corresponding raw data set stored in a corresponding one of a plurality of raw data stores; produce, based on the corresponding raw data set, a synthetic data generator model configured to generate a synthetic data set representative of the corresponding raw data set; and push synthetic information including at least one of the corresponding synthetic data set and the synthetic data generator model to the data hub. The data hub is configured to store the synthetic information received from the synthetic data generators for access by one or more clients for analysis. The system is configured such that the data hub cannot directly access the raw data sets and such that the synthetic data information can only be pushed from the synthetic data generators to the data hub.

10 Claims, 4 Drawing Sheets

(56) References Cited

OTHER PUBLICATIONS

Wasserman et al., "A Statistical Framework for Differential Privacy", Department of Statistics Machine Learning, Carnegie Mellon, submitted Oct. 2009, last revised 2018, pp. 1-42.
Ryffel et al., "A generic framework for privacy preserving deep learning", ArXiv, 2018, 5 pages.
Konecny et al., "Federated Optimization: Distributed Machine Learning for On-Device Intelligence", ArXiv, 2016, 38 pages.
McMahan et al., "Federated Learning: Collaborative Machine Learning without Centralized Training Data", Google AI Blog, <https://ai.googleblog.com/2017/04/federated-learning-collaborative.html>, 4 pages.
Charest, "How Can We Analyze Differentially-Private Synthetic Datasets?", Journal of Privacy and Confidentiality, 2010, vol. 2, No. 2, pp. 21-33.
Jordon et al., "PATE-GAN: Generating Synthetic Data with Differential Privacy Guarantees", ICLR 2019, pp. 1-21.
Zhang et al., "PrivBayes: Private Data Release via Bayesian Networks", ACM Transactions on Database Systems, vol. 42, No. 4, Article 25, 2017, 41 pages.
Qardaji et al., "PriView: Practical Differentially Private Release of Marginal Contingency Tables", SIGMOD 2014, pp. 1435-1446.
Chen et al., "Publishing Set-Valued Data via Differential Privacy", International Conference on Very Large Data Bases, 2011, vol. 4, No. 11, pp. 1087-1098.
Xu et al., "Synthesizing Tabular Data using Generative Adversarial Networks", ArXiv, 2018, 12 pages.
Patki et al., "The Synthetic Data Vault", IEEE International Conference on Data Science and Advanced Analytics, 2016, 12 pages.
Nowok et al., "synthpop: Bespoke Creation of Synthetic Data in R", Journal of Statistical Software, vol. 74, No. 11, 2016, 26 pages.
O'Keefe et al., "Comparison of Two Remote Access Systems Recently Developed and Implemented in Australia", International Conference on Image Analysis and Processing, 2013, pp. 299-311.
International Search Report and Written Opinion for Application No. PCT/GB2021/050828 dated Jun. 24, 2021 (15 pages).

* cited by examiner

DEVICE AND METHOD FOR SECURE PRIVATE DATA AGGREGATION

TECHNICAL FIELD

The present disclosure relates to computer systems and computer implemented methods for enabling the analysis of multiple raw data sets whilst protecting the privacy of information within the raw data sets. In particular, but without limitation, this disclosure relates to means for enabling the secure analysis and modelling of anonymous data from multiple secure sources without compromising the security or privacy of the original data sources.

BACKGROUND

Advances in machine learning and data analytics have seen an increase in the value of raw data. With the value of raw data growing, it is becoming increasingly important that data security is maintained, not only for security but also to maintain privacy and comply with local regulations.

Whilst a single data set may be sufficient for training machine learning systems for some applications, significant improvements in performance can be found in some cases by increasing the size of the training data set. It can often be difficult for an individual company to obtain sufficient amounts of data to effectively train machine learning models. Accordingly, improvements in performance can be found by combining data from different sources (e.g. from different companies).

Having said this, given the value of raw data and the requirements for maintaining privacy, it is important that data security is maintained. Some computing systems have strict Chinese walls to safeguard information and to comply with local regulations (e.g. within the banking industry). Equally, many companies and research groups are unable to share raw, non-anonymous data due to the need to maintain user privacy. This can make data analysis across different data sources difficult.

SUMMARY

In light of the above, there is a need for an improved means of collecting or aggregating data from different sources and analysing the data whilst maintaining the security and privacy of the original raw data. This is particularly important where data is being shared outside of a trusted computing environment or between users or systems that do not fully trust each other. For instance, individuals' data may be protected under laws or regulations and the sharing of this data either between entities (e.g. between businesses) or across borders might be prohibited.

One option for resolving this is to utilise federated machine learning. Having said this, federated machine learning suffers from issues with regard to normalization data across multiple sources and the requirement to give systems access to every data source. Furthermore, federated machine learning can suffer from privacy issues with regard to the sharing of prediction errors. In addition, federated machine learning does not allow different privacy constraints to be applied to different sources of information.

To solve the above problem, embodiments described herein protect the privacy of individuals represented within raw data by instead generating and sharing synthetic data that shares attributes of the raw data but does not compromise the security or privacy of the original raw data. The specific embodiments described herein improve data security and reduce the attack surface of the network by implementing the synthetic data generators within a trusted environment and collecting the synthetic data across multiple sources in a data hub. The data hub can act as a bastion host that protects the original data sources from attack, thereby reducing the attack surface of the network.

To protect the original data sources, the network is configured so that synthetic data can only be pushed from the synthetic data generators, and therefore cannot be pulled from the synthetic data generators by the data hub. Clients (e.g. data scientists) can then access synthetically generated data from multiple sources via the data hub to analyse the data (e.g. to train machine learning models on the synthetic data).

Furthermore, to protect privacy of individuals referenced in the original data sources, the synthetic generators may be configured to generate the synthetic data in order to comply with a set level of privacy (e.g. a set level of differential privacy).

According to an aspect there is provided a computing system for enabling the analysis of multiple raw data sets whilst protecting the privacy of information within the raw data sets. The system comprises a plurality of synthetic data generators and a data hub. Each synthetic data generator is configured to: access a corresponding raw data set stored in a corresponding one of a plurality of raw data stores; produce, based on the corresponding raw data set, a synthetic data generator model configured to generate a synthetic data set representative of the corresponding raw data set; and push synthetic information including at least one of the corresponding synthetic data set and the synthetic data generator model to the data hub. The data hub is configured to store the synthetic information received from the synthetic data generators for access by one or more clients for analysis. The system is configured such that the data hub cannot directly access the raw data sets and such that the synthetic data information can only be pushed from the synthetic data generators to the data hub.

The privacy of the raw data sets may therefore be preserved through by sharing only synthetic data. By only allows synthetic information to be pushed to the data hub, the original raw data sets are protected.

In one embodiment, each synthetic generator model is configured to generate its corresponding synthetic data set to comply with a corresponding privacy level relative to its corresponding raw data set. This may be achieved through the addition of noise within the synthetic data set such that the synthetic data generator provides a set level of privacy loss relative to the raw data set.

In one embodiment, each synthetic generator model is configured to generate its corresponding synthetic data such that the corresponding synthetic data set is differentially private according to the corresponding privacy level. The privacy level for differential privacy can correspond to a privacy parameter (epsilon ($\in$)) value defining the maximum privacy loss achieved by removing at most one entry from the synthetic data set.

According to an embodiment, each synthetic data generator is configured to update one or more parameters of its corresponding synthetic data generator model based on its corresponding raw data set. Accordingly, each synthetic data generator may be configured to train its corresponding synthetic data generator model based on corresponding raw data set. The parameters of the each synthetic data generator model may be updated (optimised) to improve synthetic data set according to a given objective function, for instance, to reduce the error/difference between the synthetic data set and raw data set and/or to increase the privacy (e.g. by increasing the amount of noise added by the synthetic data generator model).

According to an embodiment, each synthetic data generator is limited to read only privileges with respect to its corresponding raw data store. This protects the original raw data store, preventing the data from being tampered with.

According to an embodiment, at least one of the synthetic data generators is configured to push its corresponding synthetic data generator model to the data hub and the data hub is configured to, for each synthetic data generator model received, generate a corresponding synthetic data set. Accordingly, the synthetic information may comprise synthetic data and/or synthetic data generator model(s).

According to an embodiment, the computing system comprises the one or more clients, wherein the one or more clients are configured to access, from the data hub, synthetic data information originating from at least two of the synthetic data generators and to aggregate the accessed synthetic data information to determine one or more attributes shared across the accessed synthetic data information.

According to an embodiment, accessing the synthetic data information originating from at the least two of the synthetic data generators comprises one or more of: pulling at least two synthetic data sets from the data hub; and pulling at least two synthetic data generator models from the data hub and, for each synthetic data generator model that has been pulled from the data hub, generating a corresponding synthetic data set using the synthetic data model.

According to an embodiment, aggregating the accessed synthetic data information comprises training a machine learning system based on the accessed synthetic data information to determine one or more attributes of the corresponding synthetic data sets. The one or more attributes may be one or more hidden parameters representing correlations or features of the accessed synthetic data information. The training may be based on one or both of synthetic data or synthetic data generator model(s).

According to a further embodiment, the system is configured to determine a relative contribution provided by one or more of the synthetic data generator models towards an objective. Determining the relative contribution provided by the one or more of the synthetic data generator models towards the objective may comprise determining a difference in performance between a first and second model. The first model may be trained to achieve the objective based on first training data including the one or more synthetic data generator models or synthetic data generated by the one or more synthetic data generator models. The second model may be trained to achieve the objective based on second training data that does not include the one or more synthetic data generator models or synthetic data generated by the one or more synthetic data generator models.

In one embodiment, determining the relative contribution provided by the one or more of the synthetic data generator models towards the objective comprises: training the first model based on the first training data; evaluating the performance of the first model with respect to the objective; training the second model based on the second training data; and evaluating the performance of the second model with respect to the objective.

In a further embodiment, the system is further configured to determine, for each of a plurality of the synthetic data generator models, a relative contribution provided the synthetic data generator model towards the objective.

According to a further aspect there is provided a computer-implemented method for enabling the analysis of multiple raw data sets whilst protecting the privacy of information within the raw data sets. The method comprises, for each of a plurality of synthetic data generators: accessing a corresponding raw data set stored in a corresponding one of a plurality of raw data stores; producing, based on the corresponding raw data set, a synthetic data generator model configured to generate a synthetic data set representative of the corresponding raw data set; and pushing synthetic information including at least one of the corresponding synthetic data set and the synthetic data generator model to a data hub. The method further comprises: storing at the data hub the synthetic information received from the synthetic data generators for access by one or more clients for analysis; and configuring a network comprising the synthetic data generators and the data hub such that the data hub is prevented from directly accessing the raw data sets and synthetic data information can only be pushed from the synthetic data generators to the data hub.

BRIEF DESCRIPTION OF THE DRAWINGS

Arrangements of the present invention will be understood and appreciated more fully from the following detailed description, made by way of example only and taken in conjunction with drawings in which.

DETAILED DESCRIPTION

Embodiments relate to secure methods and systems for enabling the analysis of multiple raw data sets whilst protecting the privacy of information within the raw data sets.

When analysing sensitive data there is often two conflicting goals:
  Utility—the ability to extract aggregate statistics; and
  Privacy—the requirement to keep aspects of the original data hidden (e.g. personal details of individuals).

Given the requirement for privacy of some datasets, data owners are often unable or reluctant to share data fully thereby reducing the ability to analyse data across multiple dataset and learn important features shared across the data sets.

Figure 1:
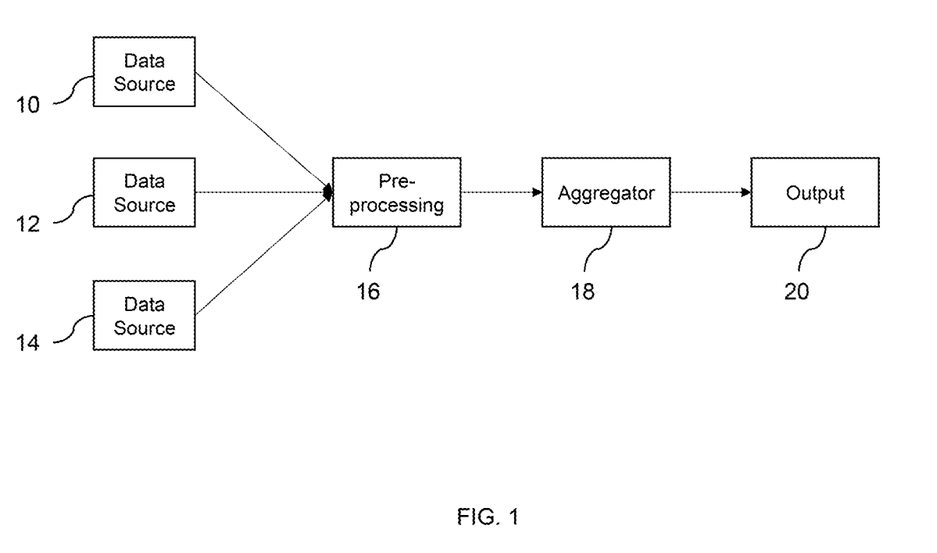
FIG. 1 shows a method for aggregating data.

FIG. 1 shows a method for aggregating data. Data from multiple data sources 10, 12, 14 is passed to a pre-processing module 16. The pre-processed data is then passed to an aggregator 18, which aggregates the pre-processed data. The aggregated data 18 is then output 20.

The pre-processing module 16 normalises the data so that it may be effectively aggregated. Normalisation can include putting the data into the same format and scaling values within the data so that attributes that are shared between the data sources are represented in the data on the same scale. Pre-processing might include mapping the data onto an encoded feature space to represent that data as points within the encoded feature space.

The aggregator 18 aggregates the pre-processed data. Aggregation may include any means of combining multiple data sets or analysing multiple data sets to learn features across the multiple data sets. This might include statistical analysis of the multiple data sets. Statistical analysis can include one or more of: determining relationships between features within the multiple data sets, creating or fitting one or more models to the multiple data sets, assessing the validity or effectiveness of one or models based on the multiple data sets, and employing predictive analytics (e.g. applying one or more models to make future predictions).

The above method suffers from a number of draw-backs.

Firstly, it puts the data at risk of leakage (e.g. via interception) as the raw data is shared outside of the specific data sources. This is problematic where the pre-processing and aggregation occur in external systems to the data sources.

Secondly, the raw data is exposed to the entity performing the pre-processing and aggregation. This is an issue where data is being shared between different entities for the purpose of aggregation. For instance, multiple banks may wish to learn more effective models based on a combination of data, but may not be able to sufficiently trust the other banks and/or the data scientists performing the aggregation.

Thirdly, it requires pre-processing to be performed on each separate source of data to normalise the data to allow it to be aggregated. This can be a difficult task in itself, depending on the complexity of the data being shared, and requires specific pre-processing steps to be configured for each data source.

To solve the above problems, embodiments described herein make use of synthetic data generators to prevent the sharing of valuable raw data. These synthetic data generators are configured to generate synthetic data according to a set level of privacy. This can, for instance, add some form of noise or variance to the synthetic data so that the privacy of the raw data is protected. The noise can be added in such a way that the synthetic data mimics properties of the original raw data without exactly copying the original raw data.

Embodiments locate these synthetic data generators in secure and highly privileged environments to protect the raw data. Synthetic data and/or synthetic data generator models are shared to a secure hub for storage. The synthetic data and/or synthetic data generator models can then be accessed by data aggregators for use in analysing the synthetic information (the synthetic data and/or synthetic data generator models).

The synthetic data generators and synthetic data generator models are only able to be pushed from the highly privileged environments of the synthetic data generators to the less privileged data hub. That is, data cannot be pulled from the synthetic data generators by the hub. This ensures that the flow of information is controlled and further protects the privileged information in the synthetic data generator environments.

When data is pushed, the sending system initiates the transfer of data to send data to the receiving system. In this case, the synthetic data generator selects the data to be sent and initiates the transfer to the data hub.

When data is pulled, the receiving system initiates the transfer of data by requesting data from the sending system. In this case, a data aggregator is able to pull data from the data hub by sending a request for the data. The data hub, upon authenticating the data aggregator and confirming that they have sufficient privileges to access the data, then retrieves the requested data and sends it to the data aggregator.

By storing the information in a secure data hub that has no privileges for requesting data from the data sources or from the synthetic data generators, the raw data is protected from attack. The data hub acts as demilitarized zone and restricts the attack surface for the overall system.

Figure 2:
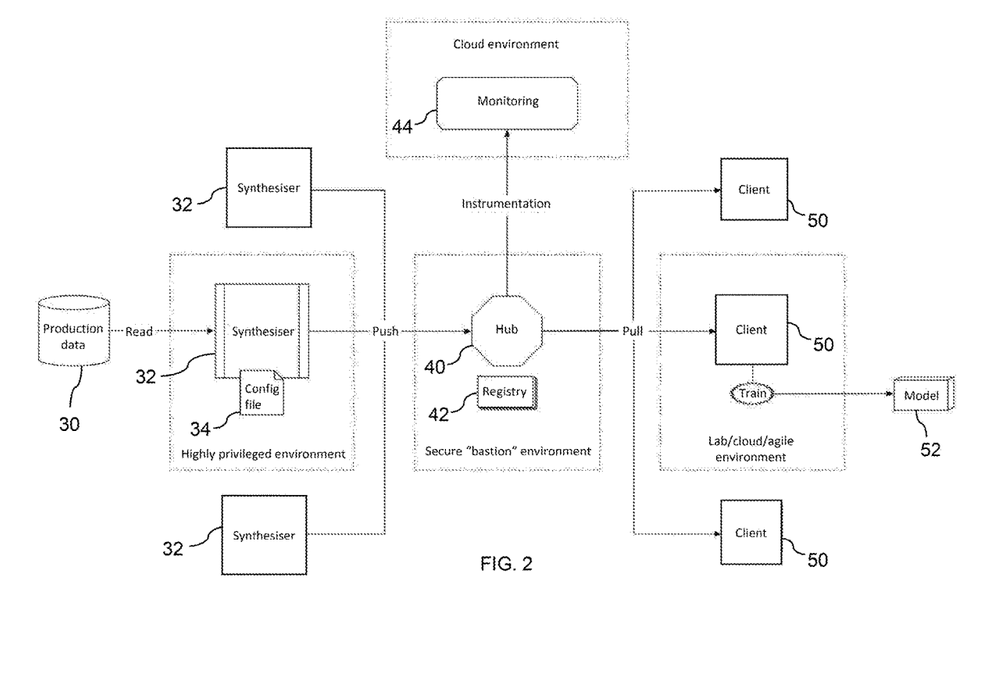
FIG. 2 shows a system for aggregating synthetic data according to an embodiment.

FIG. 2 shows a system for aggregating synthetic data according to an embodiment.

Raw production data is stored in separate databases 30. Each database 30 is provided with a corresponding synthesiser 32 (synthetic data generator). Each synthesiser 32 has read privileges for reading data from its corresponding database 30. Each synthesiser is therefore located within a highlight privileged environment.

Each synthesiser 32 is run on a computing system (such as a server) and includes one or more synthetic data generator models for generating synthetic data corresponding to the raw data stored in the corresponding database 30. Each synthesiser 32 operates according to a configuration (config) file 34. Furthermore, each synthesiser 32 may be implemented through headless architecture, in that the software implementing the synthesiser may be implemented without a graphical user interface, allowing simpler and more efficient integration within a computing system (such as a server).

It should be noted that only a single database 30 is shown in FIG. 2; however, separate databases 30 would be provided for each data source and synthesiser 32. Equally, only a single "highly privileged environment" and configuration file 34 are shown in FIG. 2; however, each synthesiser 32 would operate in its own highly privileged environment with its own configuration file 34.

Each synthesiser 32 is configured to produce one or more synthetic data generator models that are trained on the corresponding raw data from the corresponding database 30.

These each model may be fit to the raw data to produce a distribution across some embedded feature space. The model may then sample from the embedded feature space and decode the sampled vector to produce synthetic data that mimics the properties of the original raw data.

Each model may be configured to generate data according to a given level of privacy. This adjusts the resolution of the data output and can be affected by the amount of randomness introduced when generating the synthetic data (e.g. via a random seed). Specifically, each model may be configured to generate differentially private synthetic data according to a set level of privacy.

Differential privacy provides a robust, mathematically provable guarantee of privacy protection. In the context of differential privacy, a process or function (e.g. a synthetic data generator) is private if the removal of an individual user's data from the input data set does not result in more than a predefined amount of privacy loss. Privacy loss can be considered the gain of information.

For instance, in $\in$-differential privacy, a randomized process K is differentially private if, for all data sets D and D' differing by at most, one row, and any $S \subseteq \text{Range}(K)$ $$Pr[K(D) \in S] \leq \exp(\in) \cdot Pr[K(D') \in S]$$

where the probability is taken over the randomness used by the process K.

Accordingly, when training the synthetic data generators, a set level of privacy (e.g. a value of $\in$) may be input and the synthetic data generator may be trained to mimic the distribution of the input data but with the addition of noise to ensure that the set privacy level is maintained (a set amount of privacy loss is provided).

One option for training synthetic data generators to maintain privacy is to make use of Generative Adversarial Networks (GANs). GAN models are made up of a generator model and a differentiator model. The generator is trained to recreate the input data whilst the differentiator is trained to identify whether the data generated by the generator is real or fake (is the original data or synthetic data). Gradient clipping can be used during the backpropagation of gradients when updating the parameters of the discriminator model. In this case, the size of each gradient is limited to fall within a bounded range. Noise (e.g. Gaussian noise) is then added to each clipped gradient and the adapted gradients are then used in the update for the discriminator parameters. This allows noise to be added that is proportional to the sensitivity of the discriminator.

In light of the above, it is possible to train the synthetic generators to generate synthetic data that conforms to a set level (a set value of $\in$) of differential privacy. This provides a guarantee of that the privacy of the raw data is not compromised.

The data controllers for the raw data can adjust the level of privacy. By increasing the level of privacy (decreasing $\in$), the amount of randomness within the synthetic data is increased, thereby potentially reducing the quality of the synthetic data. In contrast, by decreasing the level of privacy (increasing $\in$), the amount of randomness within the synthetic data is decreased, thereby potentially increasing the quality of the synthetic data but putting the increasing the privacy exposure of the raw data.

Each synthesiser 32 is configured to push synthetic information to a data hub 40. The synthetic information shared by each synthesiser 32 may include one or both of: the synthetic data generator model(s) generated by the synthesiser 32; and synthetic data set(s) generated by the synthetic data generator model(s).

Importantly, the data hub 40 does not have permission to request or pull data from the synthesisers 32, but may only receive data pushed from the synthesisers 32. Furthermore, the data hub 40 does not have access to the raw data stored in the databases 30.

The synthesisers 32 may be configured to generate the synthetic generator models to provide outputs in a common format. Accordingly, the data output by the synthetic generator models may be normalised across multiple data sources. Alternatively, the synthetic data generator models may not be constrained in their format of output, and pre-processing and normalization may instead be performed in the data hub 40.

The data hub 40 stores the synthetic information for access by data aggregators (clients) 50. The data hub 40 may be run on a separate computing system (e.g. server) to the synthesisers 32. Alternatively, the data hub 40 may be run in the same environment as the synthesisers 32; however, in this case it will still not have access to the raw data. This allows the data hub 40 to act as a demilitarized zone to reduce the attack surface of the network.

In the present embodiment, the data hub 40 is a bastion host. This is a special-purpose computer specifically designed to withstand attacks. For instance, the data hub 40 can be implemented in a computing system configured with additional firewalls and with no additional software beyond that necessary to implement its role as the data hub 40.

The data hub 40 includes a generator registry 42, which records the various data generator models, synthesisers and data sources serviced by the data hub 40. The data hub 40 may also include a registry of access permissions. This may detail the specific permissions for each data aggregator 50 with regard to access of which sets of synthesised information. For instance, one data aggregator 50 may only be provided with access permissions for a subset of the synthesised information stored in the data hub 40 (e.g. the synthesised information from a subset of the synthesisers 32).

Data aggregators (clients) 50 are configured to access synthetic information stored in the data hub 40 according to their individual permissions. Each client 50 may be implemented on a separate computing system to the data hub 40. Each client 50 is configured to issue a request for synthetic information to the data hub 40. The data hub 40 is configured to authenticate the client 50 and check whether the client has sufficient access permissions for the requested synthetic information. If the client is successfully authenticated and has sufficient access permission, then the data hub 40 sends the requested synthetic information to the client 50.

Each client may request one or more synthetic data sets and/or one or more synthetic data generator models, depending on what is stored in the data hub 40 and the access permissions of the client 50. The client 50 may utilise a received synthetic data generator model to generate a synthetic data set. Either way, the client may obtain synthetic information that relates to multiple data sources (multiple databases 30) through the data hub 40, dependent on their access permissions. The client may then aggregate the synthetic information from the multiple sources to learn information across the multiple sources.

For instance, based on synthetic data sets reflective of multiple raw data sets, a client 50 may train a machine learning model 52 to perform a specific task (e.g. classification, regression, etc.). By providing access to synthetic data representing multiple data sources, a more accurate machine learning model 52 may be trained.

Each client may operate in a lower privilege environment to the environments of the data hub 40 and synthesisers 32. This is because the clients 50 are separated from the synthesisers through the use of the data hub 40. Each client 50 is unable to directly access the synthesiser 32 or the databases 30. Instead, the only access that the clients have to data within the system is through the data hub 40.

It should be noted that FIG. 2 shows only the training step, model 52 and environment for a single client 50; however, these may be provided for each client 50.

A monitoring system 44 is provided for monitoring and providing administration over the data hub 40. The data hub 40 is configured to push errors to the monitoring system 44 for review by an administrator. Furthermore, the data hub 40 may be configured to push access information to the monitoring system 44 detailing historical usage data with regard to access of synthetic information by the data aggregators 50.

In addition to the above, the data hub 40 is configured to determine the individual contribution of each set of synthetic information to an overall objective. This allows the relative value or quality of a given set of synthetic information to be determined. The relative quality can be used to adjust the level of privacy of the generators.

The relative quality can be passed back to the respective synthesisers 32, or the administrators/users of the synthesisers 32, as a feedback signal for use in training further synthetic data generator models. Accordingly, the synthesisers 32 can utilise the relative quality of their synthetic information to train synthetic data generator models to better contribute towards the specified objective.

Alternatively or in addition, the relative contribution of a set of synthetic information can be used to quantify the value of the synthetic information for use in determining license royalty values for a given synthesiser 32 or data source 30. Different providers of data sources 30 may be incentivised to share their data (via the synthesisers) through royalty payments. Each client 50 may pay for access to the synthetic information stored in the data hub 40 and these payments may then be divided into royalty payments for each of the data sources that contributed to synthetic information accessed by the client 50. It would be unfair to remunerate each data provider equally, given that the amount of raw data provided (via the synthesisers) and the quality of their data for a given task will vary. In addition, each data provider may be given control over the resolution of the synthetic data being shared via the synthesisers 32. Higher resolution synthetic data would be more valuable but would expose more private data from the original raw data.

Accordingly, it is important to quantify the relative contribution of each source of data in order to allow feedback, either for use in training better synthetic data generators, or for use in fairly splitting royalties between data sources.

In order to quantify relative contribution to a given objective, the data hub 40 is configured to train models for achieving the objective using different subsets of the synthetic data.

Figure 3:
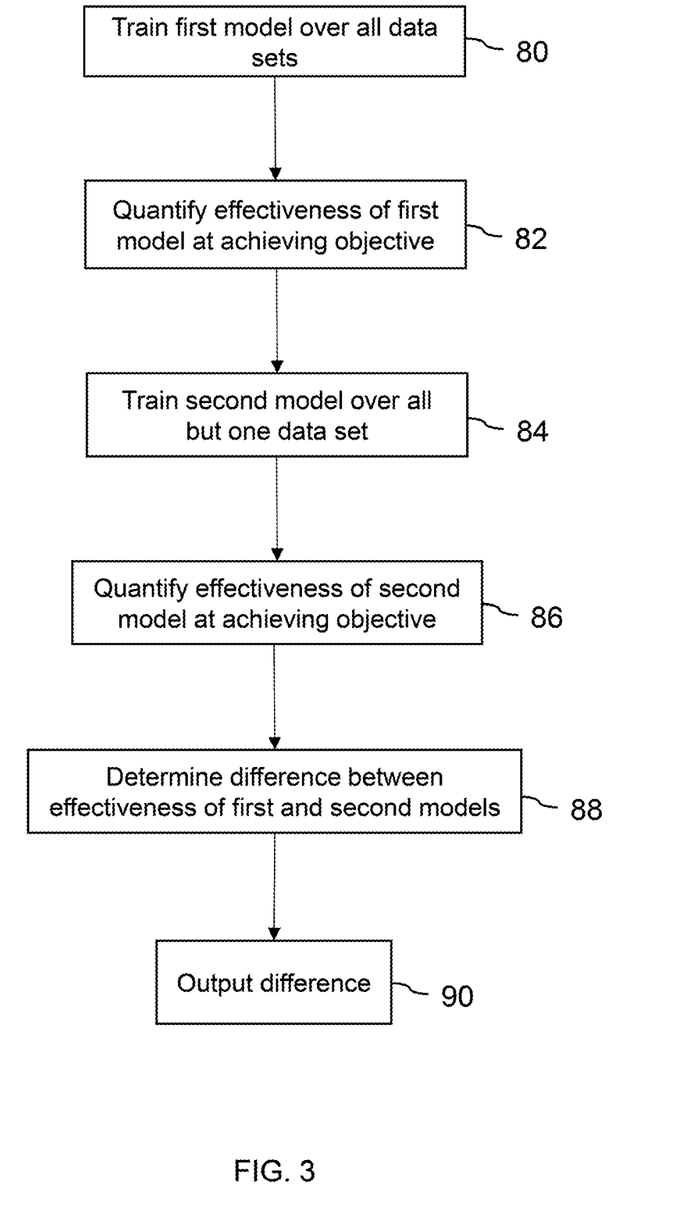
FIG. 3 shows a method for quantifying the relative contribution of a data set to a given objective according to an embodiment.

FIG. 3 shows a method for quantifying the relative contribution of a data set to a given objective according to an embodiment. This method may be implemented by the data hub 40 on different subsets of synthetic data.

The method starts by training 80 a first model for achieving the objective using all synthetic data sets being compared. The objective may be a modelling or machine learning objective such as classification, regression, etc.

The effectiveness of the first model at achieving the objective is then quantified 82. This might be a prediction error for the first model (e.g. classification error) for instance, when assessed over a validation data set (e.g. a labelled data set that has not previously been used in training).

A second model is then trained 84, using the same training method as used for the first model, but based on training data consisting of all but one of the synthetic data sets being compared. That is, a synthetic data set is selected and removed from the training set when training the second model.

The effectiveness of the second model at achieving the objective is then quantified 86 using the same metric as used for the first model. The relative effectiveness of the two models is then determined by calculating the difference between the effectiveness of the first model and the effectiveness of the second model 88.

The difference provides a measure of the relative contribution of the data set that was excluded from the training of the second model. This value is therefore output 90 as the relative contribution of the excluded data set to achieving the specified objective. Steps 84-90 may then be repeated, with different data sets being selected for assessment by exclusion from the training set.

Where the exclusion of a data set causes a large drop in performance, this indicates that the data set contributes significantly to training a model for achieving the objective. Conversely, where the data set provides little to no drop, then this indicates that the data set does not significantly contribute to training the model for achieving the objective. Where there is an increase in performance from excluding the data set, this suggests that the data set is actively contributing against training an effective model for the objective.

In the above method, the contribution of each source towards an objective can be determined by dividing the synthetic data sets according to source (according to synthesiser 32) and quantifying their relative contributions. Alternatively, the synthetic data may be divided according to synthetic data model (given that a single synthesiser 32 may provide multiple models).

Whilst the embodiment of FIG. 3 discusses training based on specific data sets, it is also possible to train a model based on the properties (e.g. weights) of a given synthetic data generator. In this regard, one or more ensemble or hybrid models might be produced by combining synthetic data generators, for instance, through methods such as bagging, boosting, stacking or other hybrid methods.

In light of the above, embodiments are provided that allow the sharing of information from multiple data sources securely without risking exposure of private or confidential information. This is achieved by only allowing the sharing of synthetic data or synthetic data generator models (which are tailored according to each source's requirements for privacy/resolution) and only allowing these models or this synthetic data to be pushed to a data hub 40 for storage.

By only allowing synthetic information to be pushed to the data hub 40, the synthesisers and the data sources 30 are protected from attack. Clients 50 may then access synthetic data from the data hub 40 in order to train models or otherwise aggregate or analyse the synthetic data across multiple data sources. The relative contribution of each synthesiser 32 or data source 30 can be quantified for use in further improving the synthetic data generator models or in assessing remuneration for each source according to relative contribution.

Figure 4:
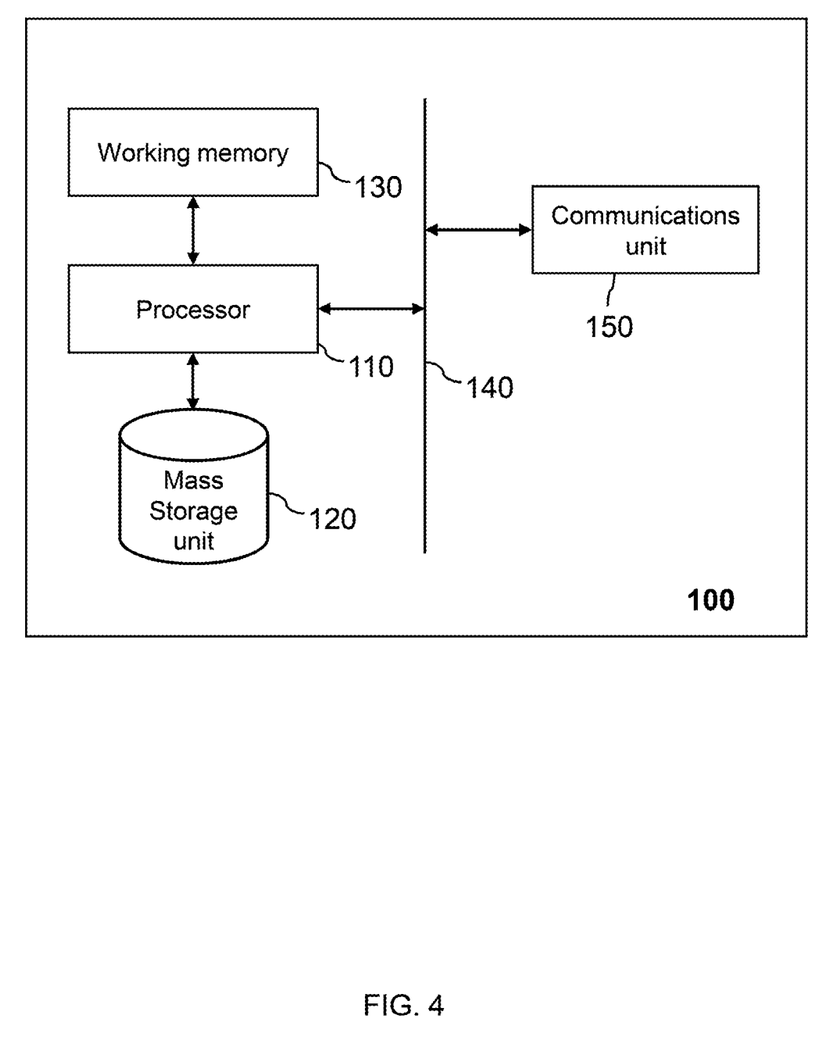
FIG. 4 shows a computing system for implementing the methods described herein.

While the reader will appreciate that the general methods described herein are applicable to any computing system, a typical computing system is illustrated in FIG. 4, which provides means capable of putting an embodiment, as described herein, into effect. As illustrated, the computing system 100 comprises a processor 110 coupled to a mass storage unit 120 and accessing a working memory 130.

Usual procedures for the loading of software into memory and the storage of data in the mass storage unit 120 apply. The processor 110 also accesses, via bus 140, a communications interface 150 that is configured to receive data from and output data to an external system (e.g. an external network or a user input or output device). The communications interface 150 may be a single component or may be divided into a separate input interface and a separate output interface.

The processor is configured to implement the methodology described herein based on executable software stored within the mass storage unit 120. The software can be embedded in original equipment, or can be provided, as a whole or in part, after manufacture. For instance, the software can be introduced, as a whole, as a computer program product, which may be in the form of a download, or to be introduced via a computer program storage medium, such as an optical disk or connectable memory drive (such as a Universal Serial Bus flash drive). Alternatively, modifications to an existing controller can be made by an update, or plug-in, to provide features of the above described embodiment.

The computing system 100 may implement the functionality of the data hub 40, the synthesiser 32 the client 50, the monitoring system 44 or any other computing system described herein.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A computing system for enabling the analysis of multiple raw data sets whilst protecting the privacy of information within the raw data sets, the computing system comprising a plurality of synthetic data generators and a data hub, wherein:
   each synthetic data generator comprises one or more processors configured to:
      access a corresponding raw data set stored in a corresponding one of a plurality of raw data stores;
      produce, based on the corresponding raw data set, a synthetic data generator model configured to generate a synthetic data set representative of the corresponding raw data set; and
      push synthetic information including at least one of the corresponding synthetic data set and the synthetic data generator model to the data hub;
   the data hub comprises:
      memory configured to store the synthetic information received from the synthetic data generators for access by one or more clients for analysis; and
      one or more processors configured to determine a relative contribution provided by one or more of the synthetic data generator models towards an objective, wherein determining the relative contribution provided by the one or more of the synthetic data generator models towards the objective comprises determining a difference in performance between a first and second model, wherein:
         the first model is trained to achieve the objective based on first training data including the one or more synthetic data generator models or synthetic data generated by the one or more synthetic data generator models; and
         the second model is trained to achieve the objective based on second training data that does not include the one or more synthetic data generator models or synthetic data generated by the one or more synthetic data generator models; and
   the system is configured such that the data hub cannot directly access the raw data sets and such that the synthetic data information can only be pushed from the synthetic data generators to the data hub,
   wherein each synthetic generator model is configured to generate its corresponding synthetic data set to comply with a corresponding privacy level relative to its corresponding raw data set, and
   wherein each synthetic generator model is configured to generate its corresponding synthetic data such that the corresponding synthetic data set is differentially private according to the corresponding privacy level.

2. The system of claim 1 wherein each synthetic data generator is configured to update one or more parameters of its corresponding synthetic data generator model based on its corresponding raw data set.

3. The system of claim 1 wherein each synthetic data generator is limited to read only privileges with respect to its corresponding raw data store.

4. The system of claim 1 wherein at least one of the synthetic data generators is configured to push its corresponding synthetic data generator model to the data hub and the data hub is configured to, for each synthetic data generator model received, generate a corresponding synthetic data set.

5. The system of claim 1 further comprising the one or more clients, wherein the one or more clients are configured to access, from the data hub, synthetic data information originating from at least two of the synthetic data generators and to aggregate the accessed synthetic data information to determine one or more attributes shared across the accessed synthetic data information.

6. The system of claim 5 wherein accessing the synthetic data information originating from at the least two of the synthetic data generators comprises one or more of:
   pulling at least two synthetic data sets from the data hub; and
   pulling at least two synthetic data generator models from the data hub and, for each synthetic data generator model that has been pulled from the data hub, generating a corresponding synthetic data set using the synthetic data model.

7. The system of claim 5 wherein aggregating the accessed synthetic data information comprises training a machine learning system based on the accessed synthetic data information to determine one or more attributes of the corresponding synthetic data sets.

8. The system of claim 1 wherein determining the relative contribution provided by the one or more of the synthetic data generator models towards the objective comprises:
   training the first model based on the first training data;
   evaluating the performance of the first model with respect to the objective;
   training the second model based on the second training data; and
   evaluating the performance of the second model with respect to the objective.

9. The system of claim 1 further configured to determine, for each of a plurality of the synthetic data generator models, a relative contribution provided the synthetic data generator model towards the objective.

10. A computer-implemented method for enabling the analysis of multiple raw data sets whilst protecting the privacy of information within the raw data sets, the method comprising:

for each of a plurality of synthetic data generators:
  accessing a corresponding raw data set stored in a corresponding one of a plurality of raw data stores;
  producing, based on the corresponding raw data set, a synthetic data generator model configured to generate a synthetic data set representative of the corresponding raw data set; and
  pushing synthetic information including at least one of the corresponding synthetic data set and the synthetic data generator model to a data hub;
storing at the data hub the synthetic information received from the synthetic data generators for access by one or more clients for analysis; and
configuring a network comprising the synthetic data generators and the data hub such that the data hub is prevented from directly accessing the raw data sets and synthetic data information can only be pushed from the synthetic data generators to the data hub; and
determining a relative contribution provided by one or more of the synthetic data generator models towards an objective, wherein determining the relative contribution provided by the one or more of the synthetic data generator models towards the objective comprises determining a difference in performance between a first and second model, wherein:
the first model is trained to achieve the objective based on first training data including the one or more synthetic data generator models or synthetic data generated by the one or more synthetic data generator models; and
the second model is trained to achieve the objective based on second training data that does not include the one or more synthetic data generator models or synthetic data generated by the one or more synthetic data generator models,
wherein each synthetic generator model is configured to generate its corresponding synthetic data set to comply with a corresponding privacy level relative to its corresponding raw data set, and
wherein each synthetic generator model is configured to generate its corresponding synthetic data such that the corresponding synthetic data set is differentially private according to the corresponding privacy level.

* * * * *